(12) United States Patent
Yu et al.

(10) Patent No.: US 9,256,266 B1
(45) Date of Patent: Feb. 9, 2016

(54) NEGATIVE BIT LINE DRIVER CIRCUITRY

(75) Inventors: Haiming Yu, Pleasanton, CA (US); Wei Zhang, San Jose, CA (US); Hao-Yuan Howard Chou, San Jose, CA (US); Ray Ruey-Hsien Hu, Milpitas, CA (US)

(73) Assignee: Altera Corporation, San Jose, CA (US)

(*) Notice: Subject to any disclaimer, the term of this patent is extended or adjusted under 35 U.S.C. 154(b) by 959 days.

(21) Appl. No.: 13/289,953

(22) Filed: Nov. 4, 2011

(51) Int. Cl.
*G06F 1/00* (2006.01)
*G06F 1/32* (2006.01)

(52) U.S. Cl.
CPC .................................. *G06F 1/3203* (2013.01)

(58) Field of Classification Search
CPC ..................................................... G11C 11/417
USPC .................................................. 713/300–340
See application file for complete search history.

(56) References Cited

U.S. PATENT DOCUMENTS

| 7,411,853 B2 | 8/2008 | Liu et al. |
| 8,514,611 B2 * | 8/2013 | Nguyen et al. ................ 365/154 |
| 2010/0080033 A1 | 4/2010 | Xu et al. |

OTHER PUBLICATIONS

Atesoglu et al., U.S. Appl. No. 12/910,054, filed Oct. 22, 2010.
Hu et al., U.S. Appl. No. 13/234,925, filed Sep. 16, 2011.
Chou et al. U.S. Appl. No. 13/234,990, filed Sep. 16, 2011.
Lee et al. U.S. Appl. No. 13/149,249, filed May 31, 2011.

* cited by examiner

*Primary Examiner* — Raymond Phan
(74) *Attorney, Agent, or Firm* — Jason Tsai

(57) ABSTRACT

Integrated circuits with memory elements are provided. Data may be loaded into the memory elements using write driver circuitry. The write driver circuitry may be provided with a fixed positive power supply voltage and an time-varying ground power supply voltage that is less than the positive power supply voltage. The time-varying ground power supply voltage may be generated using programmable power supply circuitry. The programmable power supply circuitry may include a pulse generation circuit and a configurable capacitive circuit. The pulse generation circuit may output a pulse signal to the capacitive circuit. In response to receiving the pulse signal, the capacitive circuit may push the time-varying ground power supply voltage to a negative value. The time-varying ground power supply voltage may be driven below zero volts for at least a portion of a write cycle to help improve write margins and increase memory yield.

20 Claims, 8 Drawing Sheets

NEGATIVE BIT LINE DRIVER CIRCUITRY

BACKGROUND

Integrated circuits such as programmable integrated circuits may contain volatile memory elements in the form of static random access memory (SRAM) cells. In programmable integrated circuits, SRAM cells may serve as configuration random access memory (CRAM) cells. Programmable integrated circuits are a type of integrated circuit that can be programmed by a user to implement a desired custom logic function. CRAM cells are used to store configuration data supplied by the user. Once loaded, CRAM cells supply control signals to transistors to configure the transistors to implement the desired logic function.

Volatile memory elements such as SRAM and CRAM cells are typically formed using a pair of cross-coupled inverters. In each memory cell, the pair of cross-coupled inverters is connected to a pair of address transistors that are turned on when data is being read from or written into the memory cell. When no data is being read from or written into the memory cell, the address transistors are turned off to isolate the memory cell.

There is a trend with each successive generation of integrated circuit technology to scale transistors towards smaller sizes, lower threshold voltages, and lower power supply voltages. Lower power supply voltages and smaller devices may lead to decreased read/write margins for volatile memory elements. This can pose challenges for reliable device operation. Moreover, smaller devices tend to suffer more from process, voltage, and temperature variations (PVT variations). Operating the memory elements at lower power supply voltages can further exacerbate the amount of variation experienced by the memory elements, resulting in reduced memory yield.

In an effort to increase memory yield, techniques that adjust memory cell power supply levels have been developed for single-port memory cells. For example, the memory cell power supply voltage is temporarily raised during read operations to enhance read stability, whereas the memory cell power supply voltage is temporarily lowered during write operations to enhance write-ability. This technique, however, cannot be applied to dual-port memory cells (i.e., memory cells having first and second ports each of which can be used to perform a read/write operation independent of the other port), because dual-port memory cells are required to be able to simultaneously read and write data using the two ports. As an example, elevating the power supply level will only facilitate a read access associated with the first port while adversely affecting a write access associated with the second port.

SUMMARY

Integrated circuits with memory circuitry are provided. The memory circuitry may include an array of memory cells formed based on cross-coupled inverting circuits. The inverting circuits may be supplied with a positive power supply voltage and a ground power supply voltage. The memory cells may be multiport memory cells. As an example, a dual-port memory cell may include a first set of access transistors serving as a first port and a second set of access transistors serving as a second port.

The array of memory cells may be arranged in rows and columns. Each row of memory cells may be coupled to a respective word line path (e.g., a path that includes one or more address lines), whereas each column of memory cells may be coupled to a respective bit line path (e.g., a path that includes one or more pairs of data lines). The word line paths may be driven by word line driver circuitry, whereas the bit line paths may be coupled to sensing circuitry operable to read data from selected memory cells and to write driver circuitry operable to load data into selected memory cells.

The write driver circuitry may include write driver circuits powered using the positive power supply voltage and a time-varying power supply voltage. During normal operation, the time-varying power supply voltage may be equal to the ground power supply voltage. During a selected portion of a write operation, the time-varying power supply voltage may be temporarily lowered to help improve write performance. For example, the time-varying power supply voltage may be reduced by a fraction of the transistor threshold voltage (i.e., a threshold voltage level associated with transistors that is set by the current fabrication technology) below zero volts.

The time-varying power supply voltage may be generated on a control line using adjustable power supply circuitry. The adjustable power supply circuitry may include at least a programmable pulse generator, a tunable capacitive circuitry, and a shorting transistor. During normal operation, the shorting transistor is turned on to short the control line to ground. During a portion of a write cycle, the programmable pulse generator may generate a pulse signal that temporarily turns off the shorting transistor so that the control line is decoupled from ground.

The pulse signal may be fed to the capacitive circuitry. In response to receiving the pulse signal, the capacitive circuitry may drive the time-varying power supply voltage below the ground power supply voltage. Upon completion of the write operation (e.g., upon deassertion of the pulse signal), the time-varying power supply voltage may be returned to the ground power supply voltage. The amount by which the time-varying power supply voltage is reduced during the write operation may be based on the capacitance provided by the capacitive circuitry. The capacitance of the capacitive circuitry may be tuned to provide the desired amount of voltage drop that ensures successful writes. The programmable pulse generator may be configured to provide a pulse signal with an optimum pulse width that maximizes die yield.

Further features of the present invention, its nature and various advantages will be more apparent from the accompanying drawings and the following detailed description.

DETAILED DESCRIPTION

Embodiments of the present invention relate to static random-access memory circuitry. The memory circuitry of the present invention may be used in any suitable integrated circuit. For example, the memory circuitry may be used in an integrated circuit memory device or an application specific integrated circuit (ASIC). The memory circuitry may also be used in a programmable logic device integrated circuit or a programmable integrated circuit of a type that is not traditionally referred to as a programmable logic device such as a digital signal processor containing programmable logic or a custom integrated circuit containing regions of programmable logic. The present invention will sometimes be described in the context of integrated circuits such as programmable logic device integrated circuits as an example.

Figure 1:
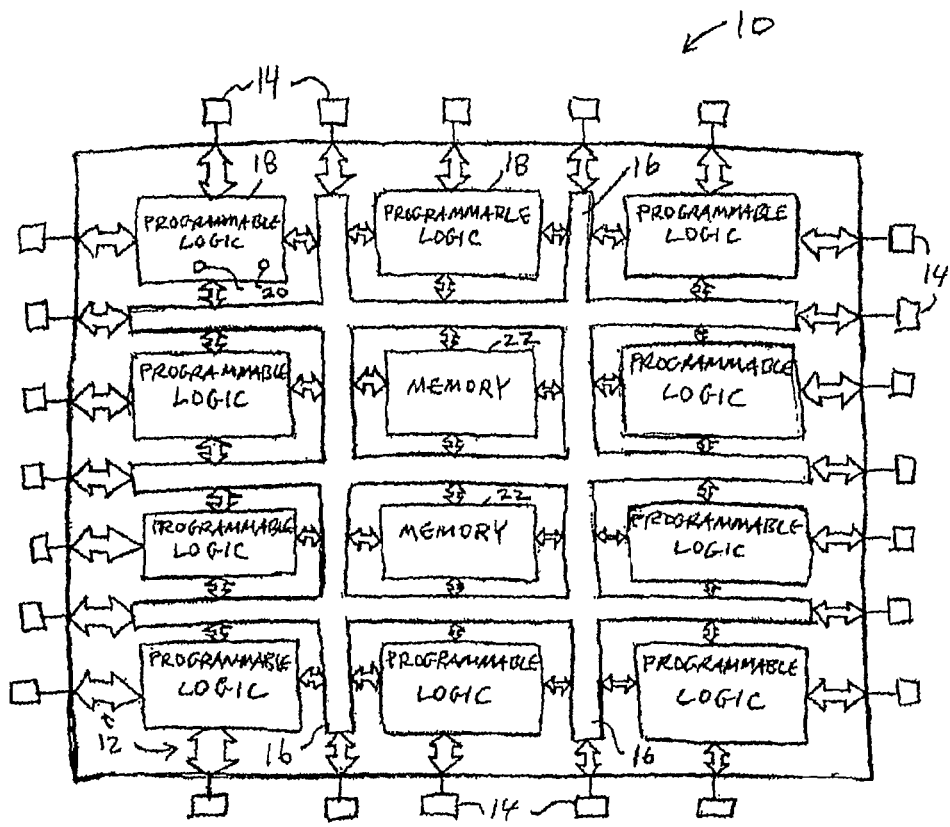
FIG. 1 is a diagram of an illustrative programmable integrated circuit in accordance with an embodiment of the present invention.

An illustrative integrated circuit such as a programmable logic device 10 in accordance with the present invention is shown in FIG. 1. Programmable device 10 has input/output circuitry 12 for driving signals off of device 10 and for receiving signals from other devices via input/output pins 14. Interconnection resources 16 such as global and local vertical and horizontal conductive lines and busses may be used to route signals on device 10. Interconnection resource 16 includes conductive lines and programmable connections between respective conductive lines and are therefore sometimes referred to as programmable interconnects 16.

Device 10 may contain programmable logic 18 and memory arrays 22. Programmable logic 18 may include combinational and sequential logic circuitry. The programmable logic 18 may be configured to perform a custom logic function. The programmable interconnects 16 may be considered to be a type of programmable logic 18.

Programmable logic device 10 may contain programmable memory elements 20. Memory elements 20 can be loaded with configuration data (also called programming data) using pins 14 and input/output circuitry 12. Once loaded, the memory elements may each provide a corresponding static control output signal that controls the state of an associated logic component in programmable logic 18. Memory elements 20 may use any suitable volatile and/or non-volatile memory structures such as random-access-memory (RAM) cells, fuses, antifuses, programmable read-only-memory memory cells, mask-programmed and laser-programmed structures, etc. Because memory elements 20 are loaded with configuration data during programming, memory elements 20 are sometimes referred to as configuration memory.

Memory arrays 22 may contain volatile memory elements such as static random-access-memory (SRAM) cells. The memory arrays 22 are used to store data signals during normal operation of device 10. The memory arrays 22 (sometimes referred to as memory blocks) need not all be the same size. For example, small, medium, and large memory arrays 22 may be included on the same programmable device. There may, for example, be hundreds of small memory arrays each having a capacity of about 512 bits, two to nine large memory arrays each having a capacity of about half of a megabit, and an intermediate number of medium size memory arrays each having a capacity of about four to eight kilobits. These are merely illustrative memory block sizes and quantities. In general, there may be any suitable size and number of memory arrays 22 on device 10. There may also be any suitable number of regions of programmable logic 18.

Each memory element 20 may be formed from a number of transistors configured to form a bistable circuit (i.e., a latch-type circuit). True and complement data storage nodes in the bistable circuit element can store corresponding true and complement versions of a data bit.

A bistable circuit element may be based on any suitable number of transistors. For example, the bistable portion of each memory element may be formed from cross-coupled inverters, from groups of multiple inverter-like circuits (e.g., in a distributed configuration that provides enhanced immunity from soft-error-upset events, etc.). Arrangements with bistable elements formed from cross-coupled inverter pairs are sometimes described herein as an example. This is, however, merely illustrative and is not intended to limit the scope of the present invention. Memory elements 20 may be formed using any suitable memory cell architecture.

With one suitable approach, complementary metal-oxide-semiconductor (CMOS) integrated circuit technology is used to form the memory elements 20, so CMOS-based memory element implementations are described herein as an example. If desired, other integrated circuit technologies may be used to form the memory elements and the integrated circuit in which the memory elements are used to form memory arrays.

The memory elements may be loaded from any suitable source of data. As an example, memory elements 20 may be loaded with configuration data from an external erasable-programmable read-only memory and control chip or other suitable data source via pins 14 and input/output circuitry 12. Loaded CRAM memory elements 20 may provide static control signals that are applied to the terminals (e.g., gates) of circuit elements (e.g., metal-oxide-semiconductor transistors) in programmable logic 18 to control those elements (e.g., to turn certain transistors on or off) and thereby configure the logic in programmable logic 18. The circuit elements may be transistors such as pass transistors, parts of multiplexers, look-up tables, logic arrays, AND, OR, NAND, and NOR logic gates, etc.

The memory elements 20 may be arranged in an array pattern. In a typical modern integrated circuit such as a programmable integrated circuit, there may be millions of memory elements 20 on each chip. During programming operations, the array of memory elements is provided with configuration data by a user (e.g., a logic designer). Once loaded with configuration data, the memory elements 20 produce static control signals at their outputs that selectively control portions of the circuitry in the programmable logic 18 and thereby customize its functions so that it will operate as desired.

The circuitry of device 10 may be organized using any suitable architecture. As an example, the logic of device 10 may be organized in a series of rows and columns of larger programmable logic regions each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Still other device arrangements may use logic that is not arranged in rows and columns.

When memory elements 20 are arranged in an array, horizontal and vertical conductors and associated loading circuitry may be used to load the memory elements with configuration data. Any suitable memory array architecture may be used for memory elements 20.

Figure 2:
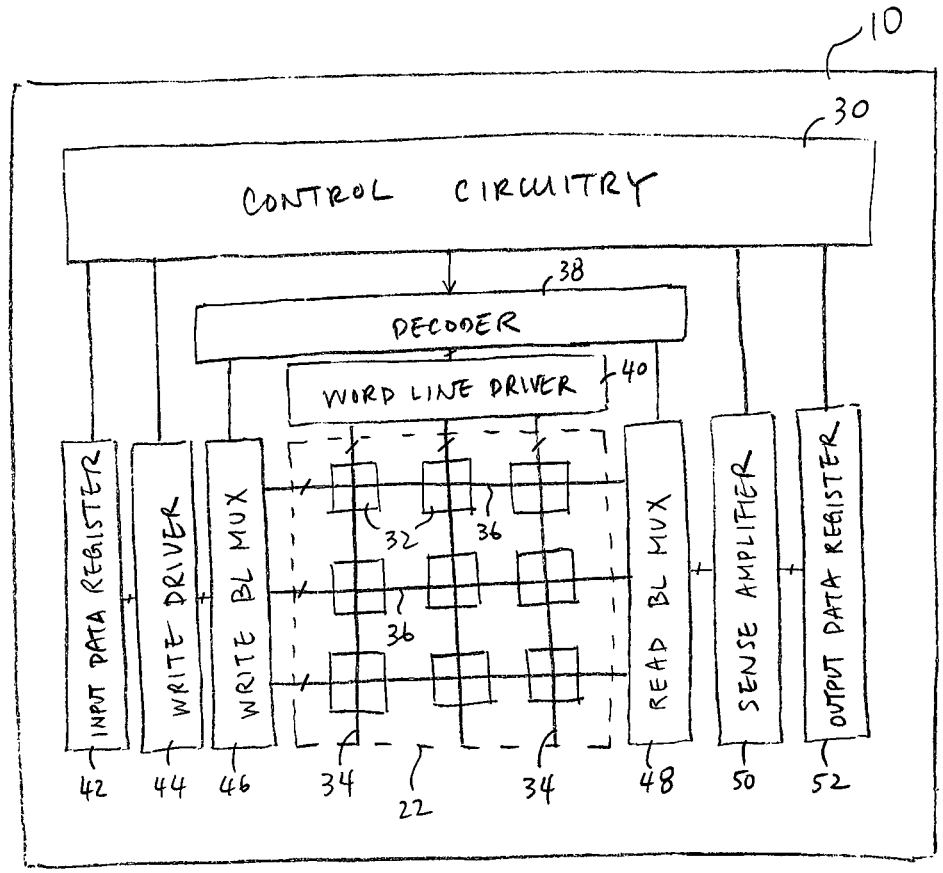
FIG. 2 is a diagram of an illustrative memory array and associated control circuitry in accordance with an embodiment of the present invention.

FIG. 2 is a diagram of memory array 22 and associated peripheral memory circuitry. As shown in FIG. 2, memory array 22 may include memory elements (sometimes referred to as memory cells) 32 arranged in rows and columns. Each row of memory cells 32 may be coupled to word line (WL) driver circuitry 40 via an associated addressing path 34. For example, a first row of memory cells 32 may be coupled to WL driver circuitry 40 via a first addressing path 34, a second row of memory cells 32 may be coupled to WL driver circuitry 40 via a second addressing path 34, etc. Addressing path 34 associated with each row of memory cells 32 may include at least one word line for supporting single-port memory operation, at least two separate word lines for supporting dual-port memory operation, at least three separate word lines for supporting tri-port memory operation, etc. WL driver circuitry 40 may be used to assert a word line signal (sometimes referred to as an address signal) on a desired one of addressing paths 34 to select a row of memory cells 32 for access.

Each column of memory cells 32 may be coupled to multiplexing (MUX) circuitry such as write bit line multiplexing circuitry 46 and read bit line multiplexing circuitry 48 via associated bit line (BL) paths 36. Bit lines 36 may sometimes be referred to as data lines. For example, a first column of memory cells 32 may be coupled to circuitry 46 and 48 via a first set of bit lines, a second column of memory cells 32 may be coupled to circuitry 46 and 48 via a second set of bit lines, etc. Bit line path 36 associated with each column of memory cells 32 may include at least one pair of bit lines to support single-port memory operation (assuming differential read/write schemes), at least two pairs of bit lines to support dual-port memory operation, at least three pairs of bit lines to support tri-port memory operation, etc. Bit lines 36 may be supplied with appropriate voltages to read data from or write data into selected memory cells 32. The terms rows and columns described herein are merely illustrative and may be used interchangeably or may be used to refer to any group/collection of memory cells.

Write BL multiplexing circuitry 46 may be configured to select a subset of bit lines 36 to be driven by write driver circuitry 44 (e.g., circuitry 46 may be configured to couple a selected portion of the data lines to write driver circuitry 44). For example, consider a scenario in which memory array 22 includes 128 columns of memory cells 32 and write driver circuitry 44 only includes 32 differential write drivers. In this example, write BL multiplexing circuitry 34 may include 4:1 multiplexing circuits that are used to couple a selected pair of bit lines in a group of four pairs of bit lines to a corresponding write driver in circuitry 44 (i.e., multiplexing circuitry 46 may be used to couple every fourth pair of bit lines to a corresponding write driver during write operations).

Read BL multiplexing circuitry 48 may be configured to couple a subset of bit lines 36 to sense amplifier circuitry 50 (e.g., circuitry 48 may be configured to couple a selected portion of the data lines to sense amplifier circuitry 50). For example, consider the scenario in which memory array 22 includes 128 columns of memory cells 32 and sense amplifier circuitry 40 only includes 32 differential sense amplifiers. In this example, read BL multiplexing circuit 48 may include 4:1 multiplexing circuits that are used to couple a selected pair of bit lines in each group of four pairs of bit lines to a corresponding sense amplifier in circuitry 50 (i.e., multiplexing circuitry 48 may be used to couple every fourth pair of bit lines to a corresponding sense amplifier during read operations).

In general, the complexity of multiplexing circuitry 46 and 48 (i.e., whether circuitry 46 and 48 provide 2:1 multiplexing, 4:1 multiplexing, 8:1 multiplexing, etc.) depends on the number of memory columns present in memory array 22 and the number of available write drivers and sense amplifiers for driving signals onto and receiving signals from bit line paths 36.

As shown in FIG. 2, word line driver circuitry 40, write BL multiplexing circuitry 46, and read BL multiplexing circuitry 48 may receive address signals from decoder 38. Write driver circuitry 44 may receive write data from input data register 42, whereas sense amplifier circuitry 50 may feed read data to output data register 52. Row and column circuitry described herein (e.g., word line driver circuitry 40, multiplexing circuitry 46 and 48, write driver circuitry 44, sense amplifier circuitry 50, data registers 42 and 52, decoder 38, and other read/write circuits) may be controlled by a control circuitry such as control circuitry 30 formed on device 10. Control circuitry 30 may be used to enable and disable appropriate circuits during read/write operations.

Figure 3:
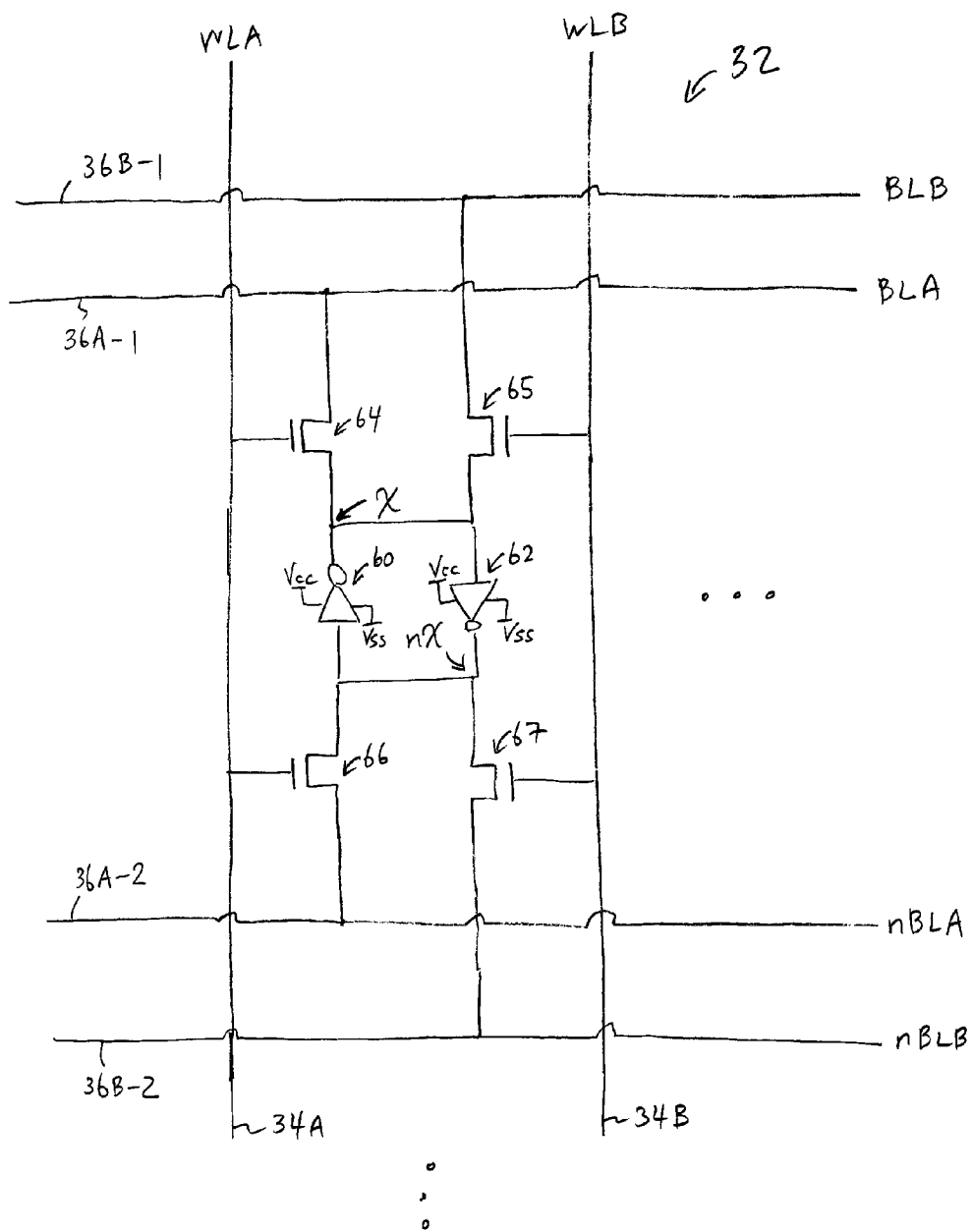
FIG. 3 is a circuit diagram of an illustrative multiport memory cell in accordance with an embodiment of the present invention.

FIG. 3 is a circuit diagram of memory cell 32 having a dual-port configuration. As shown in FIG. 3, memory cell 32 may include at least first and second cross-coupled inverters 60 and 62 each having an input and an output. In particular, the output of inverter 60 may be coupled to the input of inverter 62, whereas the output of inverter 62 may be coupled to the input of inverter 60. The output of inverter 60 may serve as a first data storage node X for memory cell 32, whereas the output of inverter 62 may serve as a second data storage node nX for memory cell 32. Inverters 60 and 62 cross-coupled using this arrangement may serve as a bistable latching circuit operable to store a single data bit (i.e., the true version of the data bit may be stored on storage node X, whereas the complement version of the data bit may be stored on storage node nX). For example, memory cell 32 may be configured to store a logic one (e.g., node X is high and node nX is low) or a logic zero (e.g., node X is low and node nX is high). Inverters 60 and 62 may each be supplied with positive power supply signal Vcc and ground power supply signal Vss (e.g., zero volts).

The cross-coupled inverters may be coupled to a first pair of bit lines through a first pair of access transistors 64 and 66. For example, access transistor 64 may be coupled between bit line 36A-1 (e.g., a data line on which true bit line signal BLA is provided) and data storage node X, whereas access transistor 66 may be coupled between bit line 36A-2 (e.g., a data line on which complement bit line signal nBLA is provided) and data storage node nX. Access transistors 64 and 66 (sometimes referred to as address transistors) may have gates that are control by word line signal WLA provided over word line 34A. Transistors 64 and 66 may serve as the first port (port A) for dual-port memory cell 32 and may be used to read data from and write data into cell 32.

The cross-coupled inverters may be coupled to a second pair of bit lines through a second pair of access transistors 65 and 67. For example, access transistor 65 may be coupled between bit line 36B-1 (e.g., a data line on which true bit line signal BLB is provided) and data storage node X, whereas access transistor 67 may be coupled between bit line 36B-2 (e.g., a data line on which complement bit line signal nBLB is provided) and data storage node nX. Address transistors 65 and 67 may have gates that are control by word line signal WLB provided over word line 34B. Transistors 65 and 67 may serve as the second port (port B) for dual-port memory cell 32 through which data may be read from and written into cell 32.

The memory architecture described in connection with FIG. 3 is merely illustrative and is not intended to limit the scope of the present invention. If desired, memory cell 32 may be arranged in a single-port configuration, may provide single-ended access, may include any number of inverting circuits, may include additional read buffer circuits, or be implemented using other suitable types of memory architecture.

Figure 4:
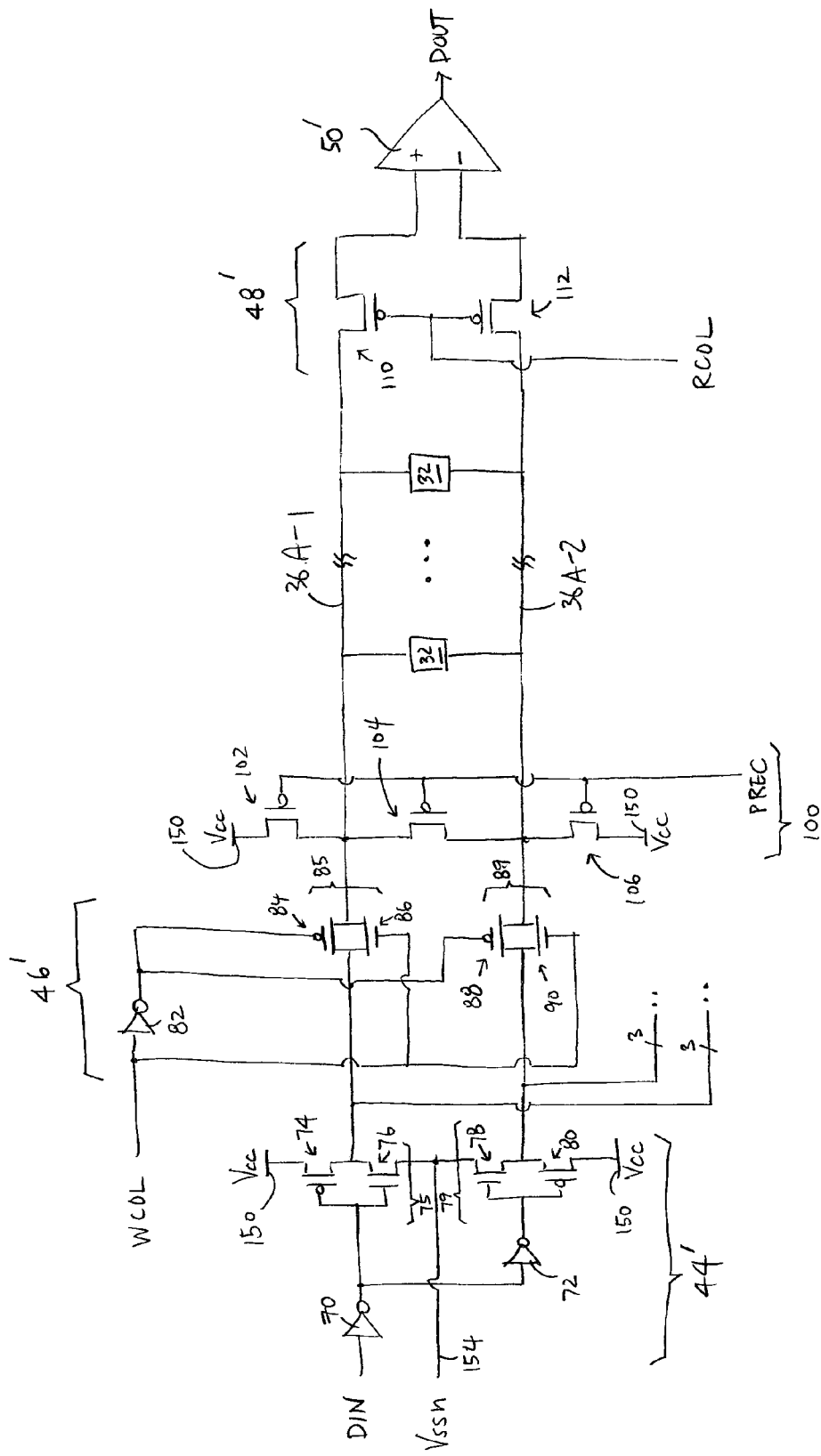
FIG. 4 is a circuit diagram of illustrative column driver and sensing circuitry in accordance with an embodiment of the present invention.

FIG. 4 is a circuit diagram showing a column of memory cells 32 coupled to column read and write circuitry associated with the first port (for clarity, column circuitry associated with the second port is not shown). The column circuitry associated with the second port may be a duplicate version of the one described below in connection with FIG. 4. As shown in FIG. 4, each memory cell 32 along the same column may be connected to corresponding bit lines 36A-1 and 36A-2. The bit lines may be coupled to precharge circuitry such as precharge circuitry 100. Precharge circuitry 100 may, for example, include p-channel transistors 102, 104, and 106 (e.g., p-channel metal-oxide-semiconductor transistors). Transistor 104 may be coupled between bit lines 36A-1 and 36A-2. Transistor 102 may be coupled between positive power supply line 150 (e.g., a power supply line on which positive power supply voltage Vcc is provided) and bit line 36A-1, whereas transistor 102 may be coupled between positive power supply line 150 and bit line 36A-2. Transistors 102, 104, and 106 may have gates that are controlled by precharge signal PREC. For example, signal PREC may be asserted (e.g., PREC may be pulled low) to enable transistors 102 and 106 to charge bit lines 36A-1 and 36A-2 high and to turn on transistor 104 for equalizing the voltage between bit lines 36A-1 and 36A-2. The bit lines may be precharged when the column is not selected for access or prior to a read operation.

The bit lines may be coupled to a corresponding read sensing circuit (e.g., sense amplifier 50' having first and second inputs) via column read select circuit 48'. Column read select circuit 48' may include p-channel transistors 110 and 112. Bit line 36A-1 may be coupled to the first (positive) input of sense amplifier 50' via transistor 110, whereas bit line 36A-2 may be coupled to the second (negative) input of sense amplifier 50' via transistor 112. Transistors 110 and 112 may have gates that are controlled using read column control signal RCOL. Signal RCOL may be driven low to select a given column for readout or may be driven high to decouple the given column from sense amplifier 50'. Read select circuit 48' may be part of read bit line multiplexing circuitry 48, whereas sense amplifier 50' may be part of sense amplifier circuitry (FIG. 2).

Sense amplifier 50' may generate output signal DOUT indicative of the current state of memory cell 32 selected for readout. For example, if the selected memory cell is storing a logic "0," sense amplifier 50' may detect a positive voltage difference across its inputs (i.e., the voltage level at its positive input is less than the voltage level at its negative input) and may drive DOUT low. As another example, if the selected memory cell is storing a logic "1," sense amplifier 50' may detect a positive voltage difference across its inputs (i.e., the voltage level at its positive input is greater than the voltage level at its negative input) and may drive DOUT high.

The bit lines may be coupled to a corresponding write driver circuit (e.g., write driver circuit 44' having first and second outputs) via column write select circuit 46'. Column write select circuit 46' may include a first transmission gate 85, second transmission gate 89, and inverter 82. Transmission gate 85 may include p-channel transistor 84 and n-channel transistor 86 coupled in parallel between the first write driver output and data line 36A-1, whereas transmission gate 89 may include p-channel transistor 88 and n-channel transistor 90 coupled in parallel between the second write driver output and data line 36A-2. N-channel transistors 86 and 90 may have gates that receive write column control signal WCOL, whereas p-channel transistors 84 and 88 may have gates that receive an inverted version of write column control signal WCOL through inverter 82. Signal WCOL may be driven high to select a given column for writing or may be driven low to decouple the given column from write driver circuit 44'. Write select circuit 46' may be part of write bit line multiplexing circuitry 46, whereas write driver circuit 44' may be part of write driver circuitry 44 (FIG. 2).

Write driver circuit 44' may include a first inverting circuit 75, a second inverting circuit 79, and inverters 70 and 72. First inverting circuit 75 may include p-channel transistor 74 and n-channel transistor 76 coupled in series between positive power supply line 150 and time-varying power supply line 154 (e.g., a power supply line on which time-varying power supply voltage Vssn is provided), whereas second inverting circuit 79 may include p-channel transistor 80 and n-channel transistor 78 coupled in series between power supply lines 150 and 154. During normal operation, voltage Vssn may be equal to nominal ground power supply voltage Vss. During write operations, Vssn may be driven to less than Vss (i.e., Vssn may be biased to a negative voltage level). Decreasing Vssn below Vss may overdrive (e.g., drive the voltage difference between gate and source terminals over Vcc) the access transistor currently passing a low voltage into memory cell 32. Overdriving access transistors in this way may serve to increase write margins.

First inverting circuit 75 has an output configured to serve as the first output of write driver circuit 44' and an input operable to receive an inverted version of input data signal DIN via inverter 70. Second inverting circuit 79 has an output configured to serve as the second output of write driver circuit 44' and an input operable to receive a true version of input data signal DIN via inverters 70 and 72. To write a logic "1" into a selected memory cell, DIN may be set high (e.g., to pass a high voltage into data storage node X and a low voltage into data storage node nX). To write a logic "0" into the selected memory cell, DIN may be set low (e.g., to pass a low voltage into data storage node X and a high voltage into data storage node nX). Write driver circuit 44' may be shared among four neighboring columns of memory, only one of which is selected using circuitry 46' during data loading operations (as an example). If desired, write driver circuit 44 may be shared between two adjacent memory columns, among three neighboring memory columns, or among any suitable number of memory columns.

Figure 5:
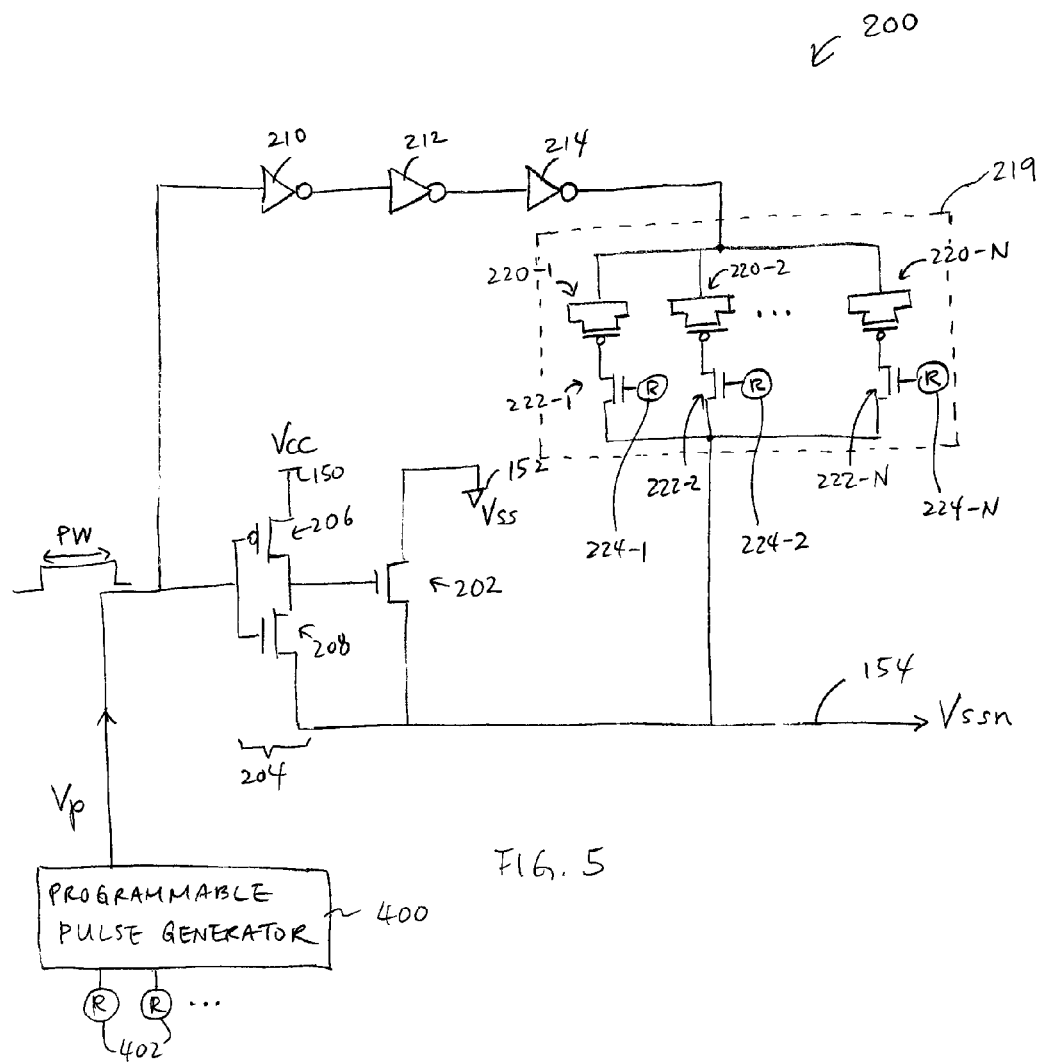
FIG. 5 is a circuit diagram of illustrative negative power supply circuitry in accordance with an embodiment of the present invention.

Time-varying (or adjustable) power supply voltage Vssn may be generated using adjustable power supply circuitry (sometimes referred to as negative power supply generation circuitry) 200. As shown in FIG. 5, adjustable power supply circuitry 200 may include programmable pulse generator 400, inverting circuit 204, transistor (or switch) 202, a chain of series-connected inverters 210, 212, and 214, and programmable (tunable) capacitive circuitry 219. Programmable pulse generator 400 may be used to generate at its output a pulse signal Vp having an adjustable pulse width PW (sometimes referred to as negative bit line activation pulse width). The pulse width PW of Vp may be tuned depending on the value of control bits stored in RAM cells 402 that are coupled to pulse generator 400. If desired, pulse generator 400 may be programmed using any suitable type of volatile/non-volatile storage element, digital or analog control signals, etc.

The output of programmable pulse generator 400 may be coupled to inverting circuit 204. In particular, inverting circuit 204 may have an input configured to receive signal Vp. Inverting circuit 204 may include p-channel transistor 206 and n-channel transistor 208 coupled in series between positive power supply line 150 and time-varying power supply line 154. Inverting circuit 204 may have an output that is coupled to the gate of transistor 202. Transistor 202 may have a first source-drain terminal that is connected to ground power supply line 152 and a second source-drain terminal that is connected to time-varying power supply line 154.

During normal operation, Vp is deasserted (e.g., Vp is low), resulting in a high voltage level at the output of inverting circuit 204 that turns on transistor 202. If transistor 202 is on, the voltage level of Vssn will be approximately equal to that of Vss (e.g., transistor 202 shorts adjustable power supply path to ground). During data loading operations, Vp may be temporarily asserted (e.g., Vp may be momentarily raised high), resulting in a low voltage level at the output of inverting circuit 204. Turning off transistor 202 serves to decouple time-varying power supply line 154 from ground power supply line 152.

The output of programmable pulse generator 400 may also be coupled to tunable capacitive circuitry 219 through the chain of series-connected inverters 210, 212 and 214. In general, there may be at least one inverter, at least three inverters, at least five inverters, or any odd number of inverters interposed between programmable pulse generator 400 and capacitive circuitry 219. Capacitive circuitry 219 may have a first terminal that is coupled to the output of the inverter chain and a second terminal that is coupled to time-varying power supply line 154. Capacitive circuitry 219 may include multiple capacitive circuits 220 coupled in parallel between the first and second terminals. For example, a first capacitive circuit 220-1 may be coupled between the first and second terminals through first n-channel transistor 222-1, a second capacitive circuit 220-2 may be coupled between the first and second terminals through second n-channel transistor 222-2, . . . , and an $N^{th}$ capacitive circuit 220-N may be coupled between the first and second terminals through $N^{th}$ n-channel transistor 224-N.

Each capacitive circuit 220 (e.g., circuit 220-1, 220-2, . . . , 220-N) may be implemented using a metal-oxide-semiconductor capacitor configuration formed using a p-channel transistor having a gate connected to associated switch 222 and having source-drain terminals both connected to the first terminal of capacitive circuitry 219 (as an example). If desired, capacitive circuits 220 may be implemented metal-oxide-metal (MOM) capacitors, metal-insulator-metal (MIM) capacitors, or other types of integrated circuit capacitive structures.

Each switch 222 (e.g., transistor 222-1, 222-2, . . . , 222-N) may have a first source-drain terminal connected to associated capacitor 220, a second source-drain terminal connected to the second terminal of capacitive circuitry 219 (as an example), and a gate that receives a control bit from associated memory element 224. For example, the gate of transistor 222-1 may receive a first control bit from memory element 224-1, the gate of transistor 222-2 may receive a second control bit from memory element 224-2, . . . , and the gate of transistor 222-N may receive an $N^{th}$ control bit from memory element 224-N.

At least a portion of the control bits in memory elements 224 contains a logic "1" to turn on at least one of transistors 222. For example, a selected one of transistors 222 may be in the on state, at least two transistors 222 may be simultaneously in the on state, at least four transistors 222 may be simultaneously in the on state, etc. Memory elements 224 may be loaded with a desired pattern of bits so that capacitive circuitry 219 is configured to provide the desired capacitance. If desired, tunable capacitive circuitry 219 may be programmed using any suitable type of volatile/non-volatile storage elements 224, digital or analog control signals, etc.

The desired capacitance provided by capacitive circuitry 219 may be based on the capacitive loading on power supply line 154, which may be coupled to multiple write driver circuits 44' (FIG. 4). Circuitry 219 may be configured so that the voltage division between the capacitance of circuitry 219 and the loading capacitance on line 154 yields a voltage drop that is approximately equal to 50% of threshold voltage Vth (e.g., a predetermined threshold voltage level set by the current transistor fabrication technology) in response to asserting Vp (as an example). Consider a scenario in which transistor threshold voltage Vth is equal to 0.3 volts. Capacitive circuitry 219 may be configured so that asserting Vp will cause Vssn to drop from zero volts to negative 0.15 volts (−0.3*50%). If desired, capacitive circuitry 219 may be programmed to provide any suitable voltage drop on line 154 in response to pulsing Vp high.

Figure 6:
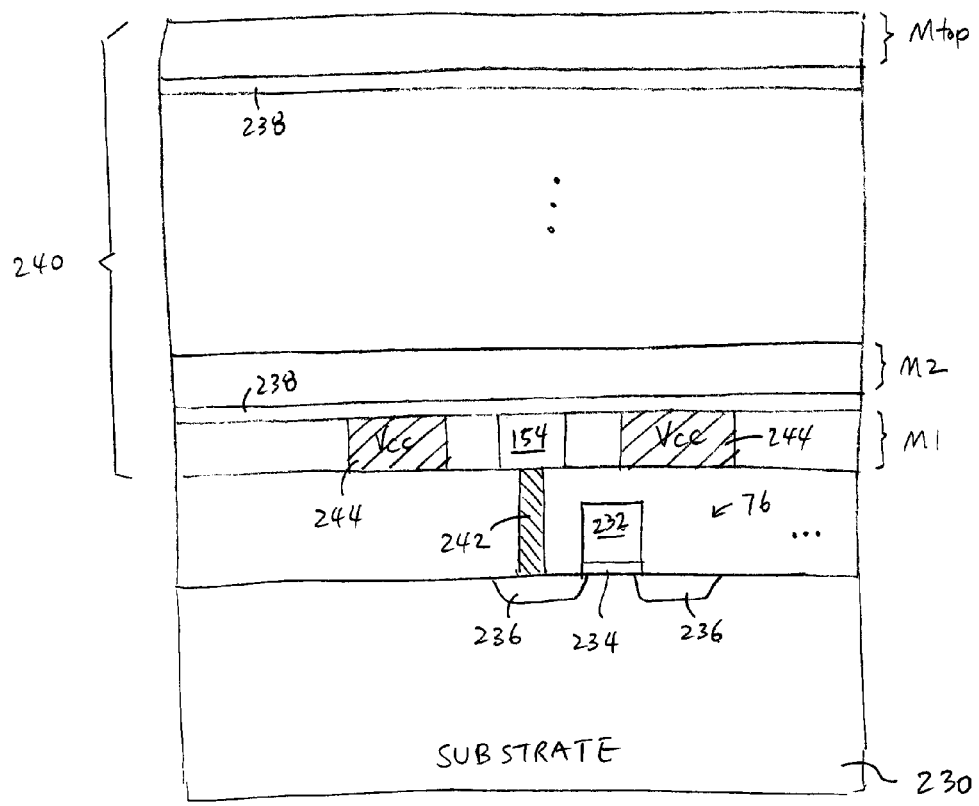
FIG. 6 is a cross-sectional side view of a double-shielded power supply line in accordance with an embodiment of the present invention.

Time-varying power supply line 154 may be surrounded by stable power supply lines to shield line 154 from undesired coupling/noise sources. FIG. 6 is a cross-sectional side view showing power supply line 154 double-shielded by power supply lines 244. Power supply lines 244 may be biased to positive power supply voltage Vcc or ground power supply voltage Vss. As shown in FIG. 6, power supply line 154 may be coupled to transistor 76 (see, e.g., FIG. 4) that is formed in semiconductor substrate 230. Transistor 76 may include source-drain regions (e.g., oxide definition regions) 236 separated by a channel region and a conductive gate structure 232 formed over the channel region. A layer of insulating material such as layer 234 of silicon oxide may be interposed between gate structure 232 and the surface of substrate 230 above the channel region. One of the source-drain terminals of transistor 76 may be coupled to time-varying power supply line 154 through conductive via 242.

Dielectric stack 240 may be formed over the surface of substrate 230. Dielectric stack 240 may include layers of silicon oxide or other dielectrics within which conductive structures are formed. Dielectric stack 240 may include metal interconnect layers (sometimes referred to as metal layers or metal routing layers) and via layers 238. Conductive routing lines (sometimes referred to as metal interconnect paths) may be formed in the metal routing layers. Via layers 238 may contain vertical conducting structures (e.g., conductive vias such as tungsten vias, copper vias, aluminum vias, or other metal vias) configured to connect the conductive routing lines formed at opposing ends of each conductive via.

The metal routing layer closest to substrate 230 may be referred to as first metal routing layer M1. Successive metal routing layers may include metal routing layers M2, M3, . . . , Mtop in that order, where metal routing layer M2 is closest to layer M1 and metal routing layer Mtop is furthest away from layer M1 (i.e., metal routing layer M1 represents a bottom layer in the dielectric stack, whereas metal routing layer Mtop represents a top layer in the dielectric stack). Dielectric stack 240 may be configured in an alternating arrangement in which each adjacent pair of metal routing layers are separated by a via layer 238. In the example of FIG. 6, time-varying power supply line 154 and shielding power lines 244 are formed in metal routing layer M1. Power supply lines 154 and 244 may be formed in other metal routing layers, if desired.

Figure 7:
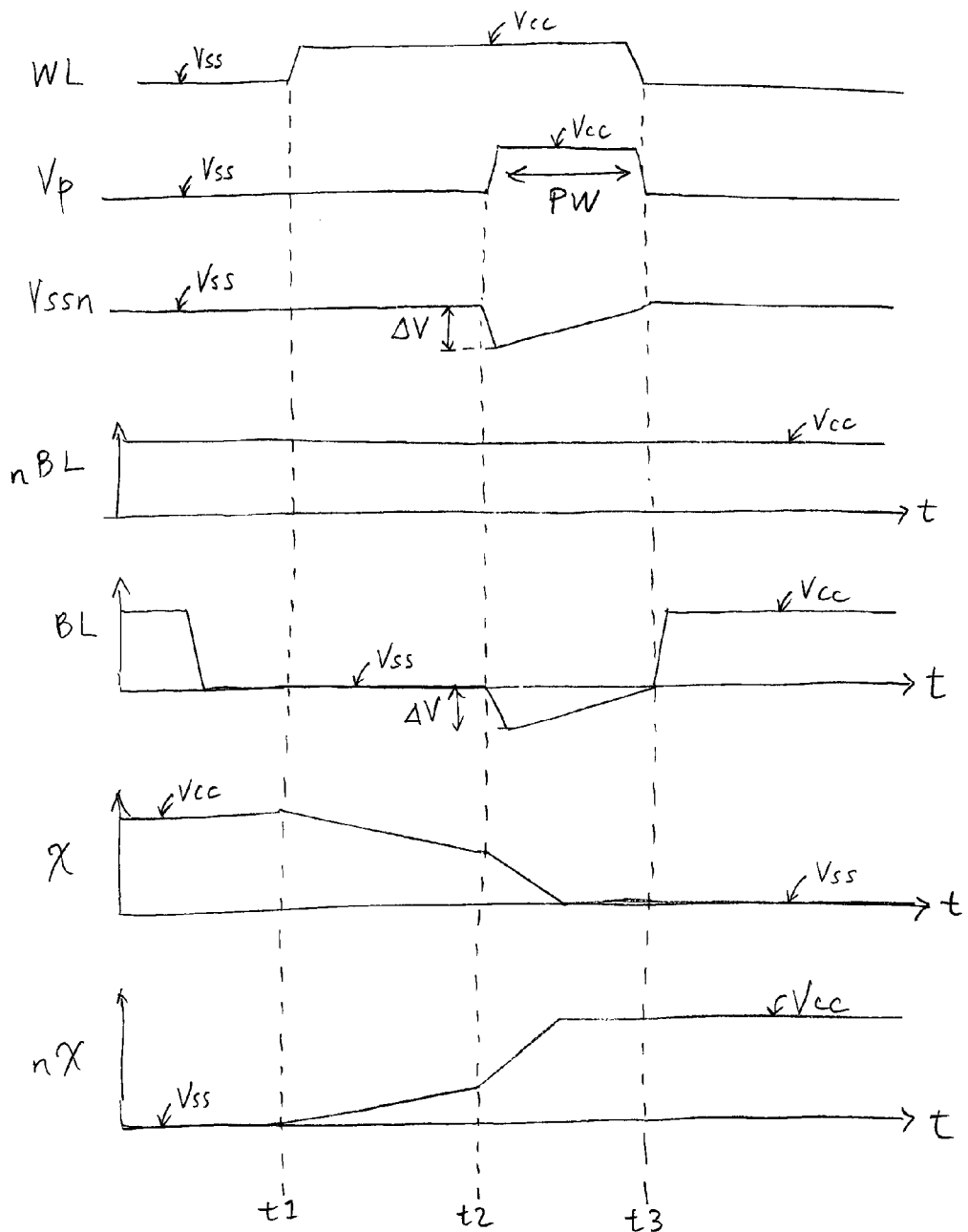
FIG. 7 is a timing diagram illustrating a successful write operation in accordance with an embodiment of the present invention.

FIG. 7 is a timing diagram illustrating a write operation in which a logic "0" is written into memory cell 32. Prior to time t1, data line signals nBL and BL are respectively driven high and low (e.g., using write driver circuitry 44), data storage nodes X and nX are respectively high and low (e.g., cell 32 is initially storing a logic "1"), and control signals WL, Vp and Vssn are at ground voltage Vss. At time t1, word line signal WL is asserted to initiate the write operation. Asserting signal WL turns on the access transistors of memory cell 32, thereby passing the write data signals on the data lines to the data storage nodes of cell 32. As a result, the high voltage on storage node X may start discharging towards ground, whereas the low voltage on storage node nX may start charging up towards positive power supply Vcc.

At time t2, signal Vp may be pulsed high for a duration PW. Asserting Vp may trigger adjustable power supply 200 to lower Vssn. The amount ΔV by which Vssn is lowered below Vss may be programmable and may be approximately equal to 50% of threshold voltage Vth (as an example). Voltage Vssn may gradually charge up towards ground as charge is being used up by write driver circuitry 44. Overdriving Vssn to a negative voltage level in this way may also cause a corresponding ΔV voltage drop in signal BL. Lowering data line signal BL using this method may facilitate success of the write operation by increasing the drive strength of the access transistors. As shown in FIG. 7, the rate of discharge/charge-up at nodes X and nX is increased when signal BL is dropped to the lower voltage.

At time t3, signal WL and Vp may be deasserted and the data lines may be precharged to Vcc. The period PW during which Vp is high (e.g., from time t2 to t3) may be adjustable and may be less than the period during which WL is high (e.g., signal Vp may be asserted a portion of the time during which WL is asserted). It may be desirable to minimize the duration PW while still enabling write operations to be successfully executed. In general, it may be desirable to assert Vp closer to the falling edge of signal WL rather than asserting Vp immediately following the rising edge of signal WL for increased write success.

Improving write performance by driving the data lines to negative voltages during a selected portion of the write cycle may help increase die yield and decrease a minimum operating voltage metric that is used to characterize the write-ability of memory cells 32 in a group of devices 10.

Figure 8:
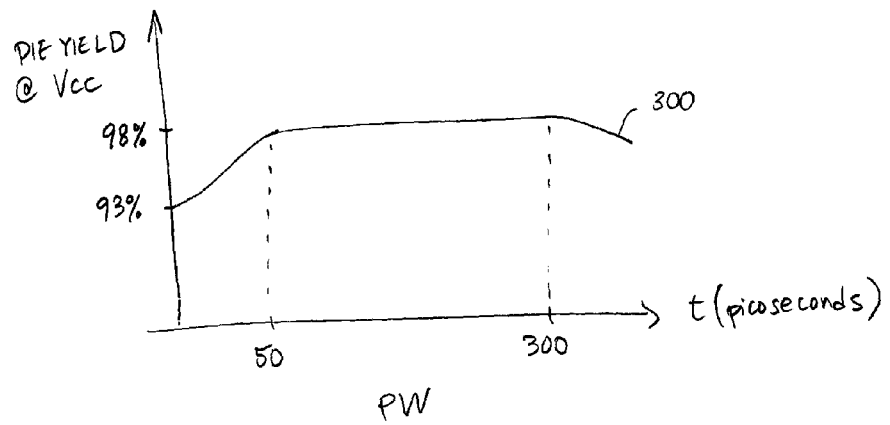
FIG. 8 is an illustrative plot of die yield versus negative bit line activation pulse width in accordance with an embodiment of the present invention.

FIG. 8 shows a plot of die yield versus Vp pulse width PW. A hundred dies may be characterized using test equipment to obtain the plot in FIG. 8 (as an example). Die yield may be defined as the number of passing dies divided by the total number of dies tested. A die is considered to be "passing" if all of its memory cells 32 are capable of properly performing read/write operations at a power supply voltage level concurrently used for testing. Curve 300 may, for example, be obtained by performing write operations on all memory cells 32 in each of the hundred dies (all powered at nominal power supply level Vcc) while adjusting the length of PW. As shown in FIG. 8, die yield may be maximized (e.g., at 98%) when PW is greater than 50 picoseconds and less than 300 picoseconds. Die yield may be relatively lower if other Vp pulse width values are used.

Figure 9:
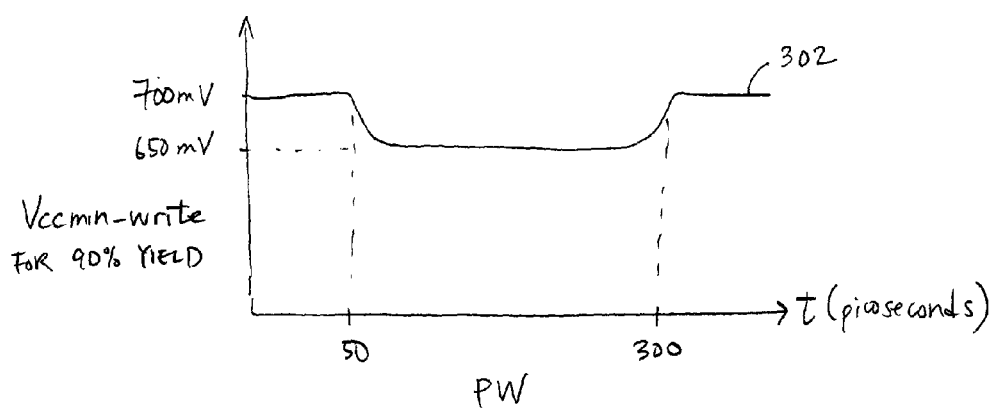
FIG. 9 is an illustrative plot of minimum operating power supply voltage versus negative bit line activation pulse width in accordance with an embodiment of the present invention.

FIG. 9 is an exemplary plot of Vccmin_write (e.g., the minimum acceptable power supply level for use in write operations) to meet a die yield of 90%. Curve 302 may, for example, be obtained by identifying Vccmin_write for 90% die yield while adjusting the duration of PW. As shown in FIG. 9, Vccmin_write may be reduced (e.g., to 650 mV) when PW is greater than 50 picoseconds and less than 300 picoseconds. Minimum operating power supply voltage level Vccmin_write may be relatively higher if other Vp pulse width values are used.

The foregoing is merely illustrative of the principles of this invention and various modifications can be made by those skilled in the art without departing from the scope and spirit of the invention. The foregoing embodiments may be implemented individually or in any combination.

What is claimed is:

1. An integrated circuit comprising:
   at least one multiport memory element supplied with a first power supply voltage and a second power supply voltage that is less than the first power supply voltage;
   a data line coupled to the at least one multiport memory element; and
   a write driver circuit having an output coupled to the data line, wherein the write driver circuit is operable to generate a signal that is equal to the second power supply voltage during a first time period and less than the second power supply voltage during a second time period that is different than the first time period at its output.

2. The integrated circuit defined in claim 1, wherein the write driver circuit has a first power supply terminal operable to receive the first power supply voltage and a second power supply terminal operable to receive a time-varying power supply voltage.

3. The integrated circuit defined in claim 2 further comprising:
   power supply circuitry operable to generate the time-varying power supply voltage at its output, wherein the power supply circuitry includes a switch coupled between the output of the power supply circuitry and a power supply line carrying the second power supply voltage.

4. The integrated circuit defined in claim 2 further comprising:
   power supply circuitry operable to generate the time-varying power supply voltage, wherein the power supply circuitry includes a pulse generator operable to generate a control signal, a switch operable to receive the control signal, and capacitive circuitry operable to receive the control signal, wherein the switch is further operable to drive the time-varying power supply voltage to a first voltage level when the control signal is deasserted, and wherein the capacitive circuitry is operable to drive the time-varying power supply voltage to a second voltage level that is less than the first voltage level when the control signal is asserted.

5. The integrated circuit defined in claim 3 wherein the power supply circuitry further includes a pulse generator operable to generate a pulse signal, and wherein the switch has a gate operable to receive the pulse signal.

6. The integrated circuit defined in claim 5 wherein the power supply circuitry further includes capacitive circuitry having a first terminal operable to receive the pulse signal and a second terminal that is coupled to the output of the power supply circuitry.

7. The integrated circuit defined in claim 5 wherein the pulse generator comprises a programmable pulse generator operable to generate the pulse signal having a programmable pulse width.

8. The integrated circuit defined in claim 6 wherein the capacitive circuitry comprises a programmable capacitive circuitry operable to provide desired capacitance at the output of the power supply circuitry.

9. The integrated circuit defined in claim 8, wherein the capacitive circuitry includes a plurality of capacitive circuits coupled in parallel between the first and second terminals.

10. The integrated circuit defined in claim 9, wherein the capacitive circuits comprises metal-oxide-semiconductor capacitors.

11. An integrated circuit, comprising:
a memory element;
a data line coupled to the memory element;
a write driver that drives the data line; and
adjustable power supply circuitry that provides a first power supply voltage to the write driver during normal memory operation and that provides a second power supply voltage that is less than the first power supply voltage to the write driver during write operations.

12. The integrated circuit defined in claim 11, wherein the adjustable power supply circuitry comprises:
a programmable pulse generator that generates a pulse signal having an adjustable pulse width.

13. The integrated circuit defined in claim 12, wherein the adjustable power supply circuitry further comprises:
an inverting circuit having an input that receives the pulse signal from the programmable pulse generator and a corresponding source terminal on which the first and second power supply voltages are provided.

14. The integrated circuit defined in claim 13, wherein the adjustable power supply circuitry further comprises:
tunable capacitive circuitry having a first terminal that receives the pulse signal from the programmable pulse generator and a second terminal that is coupled to the source terminal of the inverting circuit.

15. The integrated circuit defined in claim 14, wherein the adjustable power supply circuitry further comprises:
a odd number of inverters interposed between the programmable pulse generator and the tunable capacitive circuitry.

16. The integrated circuit defined in claim 13, wherein the adjustable power supply circuitry further comprises:
a switch that receives a control signal from an output of the inverting circuit, wherein the switch is turned on when the pulse signal is deasserted, and wherein the switch is turned off when the pulse signal is asserted.

17. A method of operating an integrated circuit having at least one memory element, comprising:
with a driver circuit, writing a data bit into the memory element during a write operation; and
during the write operation, using adjustable power supply circuitry to provide a reduced power supply voltage to the driver circuit to temporarily enhance the drive strength of the driver circuit.

18. The method defined in claim 17, further comprising:
with a pulse generator in the adjustable power supply circuitry, outputting a pulse signal to produce the reduced power supply voltage during the write operation.

19. The method defined in claim 18, further comprising:
with capacitive circuitry, receiving the pulse signal and in response to receiving the pulse signal, temporarily pulling down the power supply voltage during the write operation.

20. The method defined in claim 17, further comprising:
asserting a word line signal for a given period of time to access the memory element, wherein using the adjustable power supply circuitry to provide the reduced power supply voltage comprises using the adjustable power supply circuitry to provide the reduced power supply voltage to the driver circuit only towards the latter portion of the given period while providing a nominal power supply voltage that is greater than the reduced power supply voltage during the remaining portion of the given time period.

* * * * *